(12) United States Patent
Deumier et al.

(10) Patent No.: US 10,842,176 B2
(45) Date of Patent: Nov. 24, 2020

(54) FACILITY FOR THAWING OR TEMPERING FROZEN FOOD PRODUCTS

(71) Applicant: PROVISUR TECHNOLOGIES, INC., Chicago, IL (US)

(72) Inventors: François Deumier, Montmorency (FR); Frédéric Cecilia, Le Plessis-Bouchard (FR); Philippe Longo, Meudon (FR)

(73) Assignee: PROVISUR TECHNOLOGIES, INC., Chicago, IL (US)

( * ) Notice: Subject to any disclaimer, the term of this patent is extended or adjusted under 35 U.S.C. 154(b) by 6 days.

(21) Appl. No.: 15/324,906

(22) PCT Filed: Jul. 6, 2015

(86) PCT No.: PCT/EP2015/065341
§ 371 (c)(1),
(2) Date: Jan. 9, 2017

(87) PCT Pub. No.: WO2016/005319
PCT Pub. Date: Jan. 14, 2016

(65) Prior Publication Data
US 2017/0188608 A1    Jul. 6, 2017

(30) Foreign Application Priority Data
Jul. 7, 2014 (FR) ..................... 14 56533

(51) Int. Cl.
*A23B 4/06* (2006.01)
*A23L 3/365* (2006.01)
(Continued)

(52) U.S. Cl.
CPC ............... *A23L 3/365* (2013.01); *A23B 4/07* (2013.01); *A23B 7/04* (2013.01); *F25D 31/005* (2013.01)

(58) Field of Classification Search
CPC ... A23L 3/365; A23B 4/00; A23B 4/06; A47J 39/00; A47J 39/006
(Continued)

(56) References Cited

U.S. PATENT DOCUMENTS 3,718,082 A * 2/1973 Lipoma ..................... A23L 3/01
219/700
4,002,199 A * 1/1977 Jacobs ..................... F25D 23/12
165/61

(Continued)

FOREIGN PATENT DOCUMENTS

JP    S60-259171 A    12/1985
JP    2000-262264 A    9/2000
(Continued)

OTHER PUBLICATIONS

Oct. 6, 2015 International Search Report issued in International Patent Application No. PCT/EP2015/065341.

*Primary Examiner* — Lorne E Meade
*Assistant Examiner* — Ayub A Maye
(74) *Attorney, Agent, or Firm* — Klintworth & Rozenblat IP LLP

(57) ABSTRACT

A facility for thawing or tempering frozen food products, including: a chamber for receiving the products to be thawed or tempered, a fan for establishing a forced air flow in the chamber at a speed greater than or equal to 5 ms$^{-1}$, a heater for heating the products present in the chamber, including at least one of a device for injecting or creating steam in the
(Continued)

Figure 1:
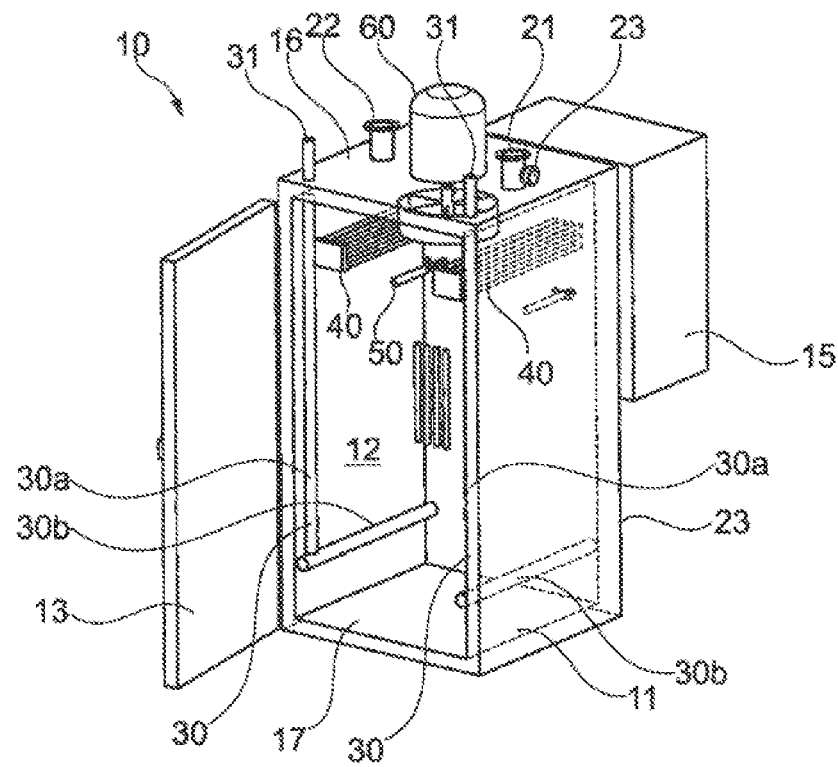

chamber, a device for spraying, showering or misting hot water or water at room temperature, a device for mixing air on a hot heat exchanger or a heating resistor, and a high-frequency electromagnetic system, a device for cooling the air in the chamber including at least one of a device for injecting cold air via a dedicated inlet, a device for mixing air on a cold heat exchanger, and a device for misting, showering or spraying cold water in the chamber.

11 Claims, 1 Drawing Sheet

(51) Int. Cl.
  *A23B 4/07* (2006.01)
  *A23B 7/04* (2006.01)
  *F25D 31/00* (2006.01)
(58) Field of Classification Search
  USPC .................. 99/325, 326, 468, 469, 470, 473
  See application file for complete search history.

(56) References Cited

U.S. PATENT DOCUMENTS

| | | | |
|---|---|---|---|
| 4,898,741 A | 2/1990 | Heide | |
| 6,133,558 A * | 10/2000 | Ueda | H05B 6/645 219/682 |
| 6,447,827 B1 | 9/2002 | Andersen | |
| 7,119,306 B2 * | 10/2006 | Boryca | A23L 3/36 219/385 |
| 2004/0066835 A1 | 4/2004 | Drews | |
| 2004/0232140 A1 * | 11/2004 | Kanzaki | H05B 6/6447 219/682 |
| 2008/0020114 A1 * | 1/2008 | Umeda | A23L 3/24 426/511 |
| 2015/0272391 A1 * | 10/2015 | Fracas | A23L 3/365 165/59 |

FOREIGN PATENT DOCUMENTS

| | | |
|---|---|---|
| JP | 2002-034534 A | 2/2002 |
| JP | 2012-223119 A | 11/2012 |

* cited by examiner

FACILITY FOR THAWING OR TEMPERING FROZEN FOOD PRODUCTS

The present invention concerns facilities and methods for thawing or tempering food products.

Thawing consists in the transformation of a frozen food product at a temperature below zero, however low, into a thawed food product, i.e. one that has passed the melting point of the water constituting it.

Tempering consists in heating a frozen product from its below-zero storage temperature, however low, to a temperature less than that of the melting point of the water constituting it.

U.S. Pat. No. 6,447,827 discloses a thawing and cooking method together with an associated chamber that includes closed circuit ventilation means and means in the form of steam injectors for heating the products to be thawed. The chamber is equipped with misting means.

US 2004/066835 discloses a thawing device including ventilation means, means for heating the products including a steam diffuser and a radiator, together with means for cooling air using a heat exchanger.

JP 2000-262264 discloses a thawing installation including a water tank maintained at a certain temperature by a water heater. This water is thereafter sprayed and then diffused into a chamber by a fan. The air in the chamber is cooled by a cooling unit. This document does not disclose the injection of steam.

JP 2002-034534 describes a thawing chamber and an associated method for controlling the temperature in the chamber. The chamber is equipped with ventilation means and means for heating the products by spraying water. The installation includes air cooling means.

The water tank that feeds the sprayer includes a mains water inlet and a hot water inlet. Two valves make it possible to control the flows of water and therefore the temperature of the water from the tank. A control computer is provided with sensors placed on the surface and at the core of the products to be thawed. It controls the valves and the air cooler and makes it possible to adjust the temperature of the sprayed water and the air. The thawing process unfolds at two temperature levels, one at high temperature and then one at a lower temperature.

This document does not describe the use of steam.

JP 2012-223119 A relates to a thawing chamber whose size is adapted to the products to be thawed, including means for heating the products, notably a steam diffusion network that can be modulated by two valves connected to boilers that are not shown and a microwave type electromagnetic system. This application also discloses cooling means employing misting of water.

There is no ventilation system as such, but there is a suction system that generates a vacuum.

U.S. Pat. No. 4,898,741 discloses a thawing method and installation in which water is sprayed into a thawing cell. A fan makes it possible to create a flow of air at a speed not exceeding 5 ms$^{-1}$.

Thawing or tempering a product presupposes compliance with two mutually contradictory requirements that are on the one hand the benefit of rapid thawing or tempering and on the other hand the maintaining of a surface temperature sufficiently low not to damage the product.

The benefit of rapid thawing is that it improves the health quality of the thawed food products, so as to prevent the thawing time exceeding the latency time of the pathogenic bacteria and flora causing deterioration. Losses by exudation are also reduced.

Another advantage linked to thawing of short duration is to be able to feed the fabrication lines rapidly and to operate on a just in time basis.

The benefit of maintaining a controlled surface temperature is to preserve the appearance as much as possible after thawing certain sensitive food products, notably certain fish, such as tuna, mackerel or sardines, notably by preventing discoloration of their skin or flesh.

The invention aims to address this problem and does so thanks to an installation for thawing or tempering frozen food products, including:

a chamber for receiving the products to be thawed or tempered, ventilation means, notably directed horizontally or vertically, for establishing a forced flow of air in the chamber, preferably at a speed greater than or equal to 5 ms$^{-1}$, means for heating the products present in the chamber, including at least one of the following: means for creation or injection of steam in(to) the chamber, notably by low-pressure steam diffusion, means for spraying, showering or misting hot water or water at room temperature, means for agitating air on a hot heat exchanger or an electric heating element, a high-frequency, notably microwave, electromagnetic system, and preferably means for creation or injection of steam in(to) the chamber or an element or a high-frequency electromagnetic system, and means for cooling the air in the chamber including at least one of the following: means for injection of cold air via a dedicated inlet, means for agitating air on a cold heat exchanger and means for misting, showering or spraying cold water in the chamber, the temperature of the cold water preferably being regulated.

This spraying or misting or showering may be effected by means of one or more nozzles, which may receive water only or both air and water. By "showering" is to be understood the formation of a jet of water that is continuous, not in the form of droplets.

If the spraying or misting of water is effected by nozzles receiving both air and water, the air directed into the nozzles may be heated or cooled, as appropriate, which can contribute to heating or cooling the water that is sprayed or misted.

By "ventilation means" is meant any fan or turbine making it possible to generate a forced flow of air in the chamber, whether the rotation axis of that fan or turbine is oriented horizontally or vertically or otherwise. The fan or the turbine may be driven by a motor fixed to a wall defining the chamber. Alternatively, moving air is injected into the chamber, for example vertically or horizontally, and produces the forced flow of air independently of the presence of a fan or a turbine in the chamber.

By "steam injection means" is meant a steam outlet in the chamber, the steam being produced externally of the chamber, or in situ production of steam in the chamber, for example by directing liquid water onto a hot part causing the water to evaporate. By "creation of steam" in the chamber is meant the formation of steam by water, notably in the form of droplets, coming into contact with a surface at a temperature higher than the boiling point of water.

By "means for cooling the air in the chamber" is meant a system for extracting from the chamber heat energy from the air.

By "means for injection of cold air via a dedicated inlet" is meant a pipe for blowing cold air into the chamber, preferably at a temperature less than or equal to 10° C.

The water sprayed or misted into the chamber may be cooled by means of a refrigerator unit or any other cold source.

The installation preferably includes means for spraying, showering or misting cold water, better still misting, preferably at a temperature below 6° C.

It is especially preferred that the input of heat be effected at least by creation or injection of steam in(to) the chamber and that cooling is effected by misting water at a regulated temperature, which misting may take place at the same time as the creation or injection of steam.

The transfer coefficient at the interface between the food and its environment is from 10 to 100 $W \cdot m^{-2} \cdot K^{-1}$ for air as against 500 to 10 000 $W \cdot m^{-2} \cdot K^{-1}$ for water. The presence of a mist of water in the thawing chamber, thanks to the possibility of misting water thanks to the aforementioned nozzle or nozzles, therefore favors the transfer of heat between the food product and its environment, creating a film of water on the surface of the products.

Injection of steam into the thawing chamber is advantageous in that it makes it possible to transfer a large amount of heat. In contact with the food, the steam cedes its latent heat change of state to the product, which represents approximately 2 260 kJ/kg of steam.

The heat transfers are all the more effective if the renewal of the area of contact between the food products and the heat-exchange fluid(s) is rapid. This renewal is brought about by maintaining turbulent conditions, which may be produced by ventilation means, which are preferably adapted to induce air speeds greater than 5 $m \cdot s^{-1}$, better still greater than 10 $m \cdot s^{-1}$.

The heating of the air induced by this intense agitation is nevertheless attenuated by the means for cooling the air and preferably by the spraying or misting of water into the chamber thanks to the nozzle or nozzles.

The installation according to the invention therefore makes it possible to heat the food products rapidly at the same time as preventing the surface temperature climbing too high or too fast and does not unduly affect the appearance of the food products.

By acting on the temperature of the sprayed or misted water and/or where applicable on that of the air feeding the corresponding nozzles, the invention further makes it possible to regulate relatively precisely the input of heat as a function of the constraints imposed on the surface temperature and therefore to control that temperature to the benefit of thawing quality.

This surface temperature depends, in the case of the invention, on the following parameters:
- the external heat input by the conversion of kinetic energy into heat by ventilation, steam, air and water mist,
- the transfer of frigories from the frozen core of the product to the surface,
- the input of external frigories via the air or the water present in the chamber in the immediate environment of the products.

In the first stage of thawing or tempering, the first two parameters may be balanced relatively easy, whereas in the second stage of thawing or tempering the transfer of frigories from the core to the surface is likely to be insufficient to compensate the input of heat induced by the aforementioned sources of heat. In fact, although regulation may prohibit the injection of steam, ventilation alone may suffice to heat the surroundings by conversion of the kinetic energy of the air into heat.

The spraying, better still misting, of cooled water has the advantage of maintaining at the surface conditions favorable to the transfer of heat without allowing thermal runaway of the surface temperature. In particular, the presence of a cooled water mist can therefore make it possible to compensate the conversion into heat of the kinetic energy of intense ventilation over a longer time period. The quality of thawing is enhanced and thanks to the invention some products may have an appearance after deep freezing that differs very little from that of the fresh products before freezing.

Depending on what is required, the installation according to the invention can therefore make it possible to maintain simultaneously a cooled water mist, injection of low-pressure steam and a high level of ventilation.

The installation may include means for misting hot water or water at a temperature greater than or equal to 15° C. or at room temperature (20° C.).

The injected or mixed air may be cooled simultaneously with the introduction of cooled water mist by misting water.

The installation preferably includes means for regulating the temperature of the water sprayed, delivered by showering or misted to a setpoint value chosen as a function of time and/or of the temperature of the products, notably their surface temperature. Where appropriate, the regulating means may also act on the temperature of the air injected into the spray or mist nozzle or nozzles. When regulation is effected as a function of time, actions corresponding to temporal sequences are predefined and executed thanks to a timebase.

The forced flow of air may be effected in a closed circuit, for example using a fan placed in a high part of the chamber.

The installation may include a feed to be connected to a domestic cold water main and the water cooling means may consist of at least one refrigerator unit adapted to cool water from the main to a required temperature, for example to a temperature less than or equal to 10° C., before spraying or misting it. This refrigerator unit may also be used to cool the air injected into and/or mixed in the chamber.

The ventilation means are preferably adapted to produce a forced flow of air at a speed greater than or equal to 5 $ms^{-1}$, better still a speed greater than or equal to 10 $ms^{-1}$, at at least one location of the chamber, the speed of the air preferably being reduced as the thawing or tempering cycle progresses.

The installation may include a feed to be connected to a domestic cold water main or to a water heater external to the chamber so as to be able to deliver water into the chamber, notably at the beginning of the thawing or tempering process, by showering, spraying or misting water at a temperature greater than 20° C. or 25° C.

The means for cooling air in the chamber may include one or more heat exchangers, for example tube heat exchangers, in which circulates a fluid, for example glycolated water. This glycolated water may be that from a glycolated water main present in the plant and may also serve to cool the water that is or misted, and where applicable the air injected into the spraying or misting nozzles. This glycolated water may equally be cooled by a dedicated refrigerator unit of the installation and for example fixed to a wall delimiting the chamber.

If the installation includes a system for entry of air into the chamber and exit of air from the chamber, this may refer to cold air coming directly from the environment outside the cell, for example if the latter is in a cold room.

According to another of its aspects, the invention also consists in a method of thawing or tempering frozen food products present in a chamber of a thawing or tempering installation, notably one having at least one of the above features, that method including the steps consisting in:

subjecting the products to be thawed or tempered to a forced flow of air in the chamber, notably at an air speed greater than or equal to 5 ms$^{-1}$, and injection of steam and showering, spraying or misting with water, the water misted, delivered by showering or sprayed preferably having on completion of thawing or tempering a temperature below 10° C., better still below 5° C.

The water that is sprayed or misted is preferably at a controlled temperature. The temperature of the water that is sprayed or misted can therefore be varied as a function of time and/or a temperature measured at the surface of the products and/or at the core of the products. This makes it possible to control the surface temperature and therefore to preserve the quality of the product.

The forced flow of air is preferably effected with an air speed of at least 5 ms$^{-1}$ at at least one location in the chamber, better still at at least 10 ms$^{-1}$.

The initial temperature of the frozen products may be less than or equal to −30° C.

The injection of steam may take place during the showering or spraying or misting of water, notably cooled water.

The forced flow of air may be effected in accordance with at least two air speed regimes differing as a function of the state of thawing or tempering of the products, notably a high speed regime at the beginning of the thawing process and a low speed regime on completion of thawing or tempering. Of course, the invention is not limited to a modification of the speed and the latter may instead remain constant.

The injection of steam may be interrupted from a certain degree of thawing or tempering of the products whilst the showering, spraying or misting of water continues. The temperature of the water delivered by showering, sprayed or misted after stopping the injection of steam is preferably less than or equal to 5° C.

The temperature of the water delivered by showering, sprayed or misted can therefore vary from $T_1$ at the beginning of the thawing or tempering process to $T_2$ at the end of said process, with $T_2 < T_1$, and preferably $T_1 > 10°$ C. and $T_2 < 6°$ C.

Figure 2:
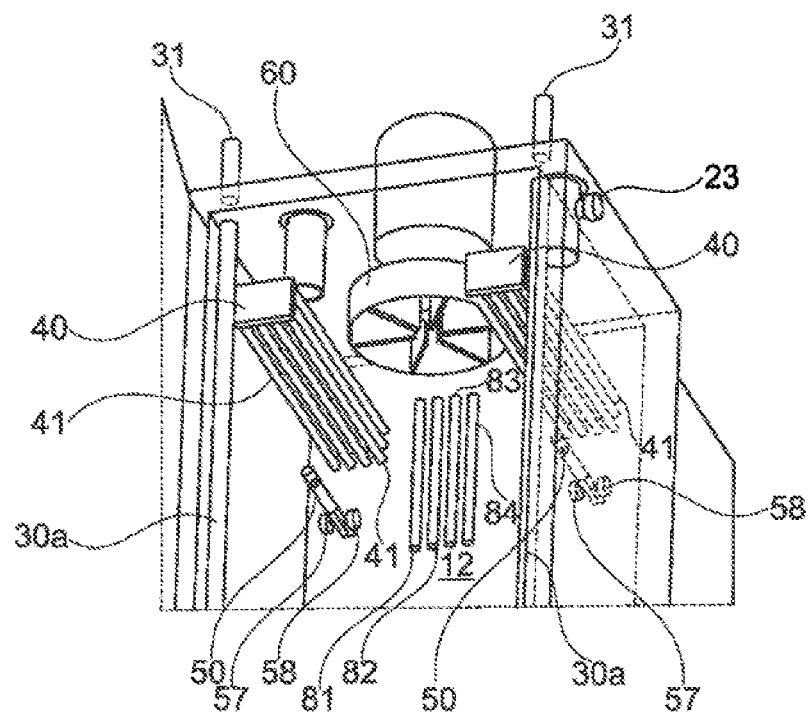

The invention will be better understood after reading the following description of one nonlimiting embodiment thereof and examining the appended drawing, in which:

FIG. 1 is a perspective view of one example of a thawing or tempering installation according to the invention, and FIG. 2 represents a detail from FIG. 1.

The thawing or tempering installation 10 according to the invention represented in FIGS. 1 and 2 includes a frame 11, also termed a thawing or tempering cell, defining a chamber 12 into which the food products to be thawed or tempered may be introduced. The frame 11 is preferably made of stainless steel.

A door 13 makes possible access to the chamber 12 for putting in and removing products, which may be on a trolley.

The installation 10 may include, as shown, a refrigerator unit 15 that is for example fixed to the frame 11 on the side opposite the door 13.

The chamber 12 can communicate with the outside via an air inlet 21 and an air outlet 22 preferably situated on the top wall of the frame 11. The inlet and outlet may be equipped with check valves.

The air inlet and outlet valves are open if it is required that ambient air from the outside enters. That air may be that from a hot zone (25° C.) or from a cold zone (4° C.). Opening may also be the result of a request for relative humidity regulation.

The air inlet 21 may be provided with a temperature probe 23 making it possible to determine the temperature of the incoming air. The latter may be cooled air if the cell is placed in a cold room, the temperature of which is between −10° C. and +10° C. inclusive, for example.

The installation 10 includes manifolds 30 for diffusion of steam into the chamber 12. These manifolds 30 communicate with steam inlets 31 connected to steam feed pipes, not represented. In the example shown, there are two manifolds 30 respectively situated in the vicinity of the left and right vertical walls of the frame 11. Each has a vertical section 30a that extends from the top wall 16 of the frame 11 over the greater part of the height of the chamber 12 and a horizontal section 30b near the floor 17 of the chamber 12.

The installation 10 may include, as shown, one or more heat exchangers 40 present in the chamber 12 to cool the air therein.

There are two exchangers 40, for example, as shown, present in the upper part of the chamber 12. They may be tubular water/air exchangers, the air from the chamber 12 circulating over the outside of the tubes 41, the latter being horizontal and having cold glycolated water passed through them. This water is for example cooled by the refrigerator unit 15 or comes from a cold glycolated water main of the plant.

The installation 10 includes nozzles 50 for misting water or an air/water mixture inside the chamber 12 in order to create a water mist therein. The particle size of the misted droplets is for example of the order of 1 to 60 μm.

The nozzles 50 are preferably placed, as shown, below the exchangers 40, in the upper part of the chamber 12.

A fan 60, the motor of which is outside the chamber 12, creates a forced flow of air inside the chamber 12, with an air speed greater than 5 ms$^{-1}$, better still greater than 10 ms$^{-1}$.

The axis of the fan 60 may be vertical and situated between the exchangers 40.

The installation 10 may include a regulation central unit, also termed a programmable automatic controller, making it possible to control the operation of the various elements of the installation in order to subject the products to be thawed or tempered to conditions appropriate for warming them.

Various temperature probes are connected to this central unit and regulation is notably effected as a function of the measured temperatures.

The installation 10 may therefore include a plurality of probes, such as a core probe 81, a surface probe 82, a relative humidity probe 83 and an air temperature probe 84.

When the nozzles 50 receive compressed air and water, as shown, each air or water inlet may be equipped with a corresponding temperature probe 57, 58.

The temperature of the water feeding the nozzles and the air feeding the nozzle can therefore be controlled.

The relative humidity probe 83 can also serve to control misting in accordance with the programming of the central unit, the admission of steam and the entry of air, if for example there is a relative humidity setpoint. Regulation may operate on the relative humidity parameter as a function of temperature.

The steam that is diffused into the chamber 12 is at a temperature between 99 and 152° C. inclusive, for example.

The water that is misted via the nozzles 50 may be cold, lukewarm or hot water, its temperature preferably being controlled by the regulation central unit to remain at the required temperature, which may vary according to the stage of the thawing or tempering cycle. The misted water and/or the compressed air is or are cooled by the refrigerator unit 15 in the example shown.

To effect a thawing or tempering cycle, the food products present in the chamber 12, for example disposed on an appropriate trolley on multiple levels, are subjected for example to:

diffusion of steam via the manifolds 30,
forced flow generated by the fan 60, preferably at a speed of at least 5 ms$^{-1}$,
misting of water via the nozzles 50.

The temperature of the misted water and the air that accompanies this misting may decrease as a function of the core temperature of the food products, from more than 10° C. at the beginning when the foods are the coldest to less than 6° C., for example when the injection of steam is interrupted at the end of the cycle.

The regulation central unit receives signals from the temperature probes and controls the solenoid valves for admitting steam into the manifolds 30 and spraying of water via the nozzles 50, the speed of the fan 60 and the temperature at which the water is misted via the nozzles, so as to optimize the thawing or tempering by aiming to increase the temperature of the food products as quickly as possible at the same time as maintaining their surface temperature at a sufficiently low value to degrade the appearance of the food as little as possible.

The invention is not limited to the example shown and it is possible for example to modify the geometry of the chamber 12, the number and location of the manifolds 30 for diffusion of steam, the number and location of the nozzles 50 or the exchangers 40, and the position of the fan 60.

In a variant, the misting nozzles are fed only with water under pressure. The misting nozzles may be replaced by spraying nozzles, which create a rain of droplets in the chamber rather than a mist.

The expression "including a" must be understood as being synonymous with "comprising at least one" unless otherwise indicated.

The invention claimed is:

1. An installation for thawing or tempering frozen food products, comprising:
   a chamber configured to receive the products to be thawed or tempered;
   a fan arranged proximate to or within the chamber and configured to establish a forced flow of air in the chamber;
   a steam apparatus including a steam inlet, a valve, and at least one steam manifold coupled to the steam inlet via the valve, wherein the at least one steam manifold is positioned within the chamber to selectively distribute steam within the chamber;
   at least one nozzle arranged proximate to the chamber and configured to introduce water into the chamber;
   a refrigerator unit fluidly coupled to the at least one nozzle and configured to selectively cool the water introduced into the chamber by the at least one nozzle; and
   a controller coupled to at least the steam apparatus and the refrigerator unit to selectively command the steam apparatus and the refrigerator unit such that the steam apparatus distributes the steam within the chamber at least partially simultaneously when the refrigerator unit supplies the cold water into the chamber via the at least one nozzle,
   wherein the controller is further configured to command the refrigerator unit to regulate a temperature of the cold water introduced into the chamber via the at least one nozzle to a setpoint value based on at least one of time, a core temperature of the food products, and a surface temperature of the food products.

2. The installation as claimed in claim 1, wherein the controller is configured to selectively command the steam apparatus and the refrigerator unit such that, after the simultaneous distribution of the steam and the introduction of the cold water into the chamber, the distribution of the steam is interrupted while the introduction of the cold water into the chamber continues, and wherein the fan is configured to establish the forced flow of air in the chamber at a speed greater than or equal to 5 m/s.

3. The installation as claimed in claim 2, wherein the refrigerator unit is configured to introduce the cold water at a temperature of less than 6° C.

4. The installation as claimed in claim 1, further comprising a water heater fluidly coupled to the at least one nozzle and configured to provide the water to the at least one nozzle as heated water.

5. The installation as claimed in claim 4, wherein the controller is further configured to command the water heater and the refrigerator unit such that the water heater supplies the heated water to the at least one nozzle during a first time period and the refrigerator unit supplies cold water to the at least one nozzle during a second time period.

6. The installation as claimed in claim 5, wherein the controller is configured to command the steam apparatus to distribute the steam within the chamber during at least a portion of the first time period and the second time period.

7. The installation as claimed in claim 4, wherein the water heater is configured to provide the heated water to the at least one nozzle at a temperature greater than or equal to 15° C.

8. The installation as claimed in claim 4, wherein the water heater is configured to be coupled to a domestic hot water main and further configured to provide the heated water into the chamber via the at least one nozzle at a temperature greater than 20° C.

9. The installation as claimed in claim 1, wherein refrigerator unit is configured to be coupled to a domestic cold water main and further configured to cool the water from the main to a predetermined temperature prior to supplying the cold water into the chamber via the at least one nozzle.

10. The installation as claimed in claim 1, wherein the fan is configured to produce the forced flow of air at a speed greater than or equal to 10 m/s in least one location in the chamber.

11. The installation as claimed in claim 1, wherein the controller is coupled to the fan and configured to command the fan to selectively establish the forced flow of air in the chamber according to at least two different air speeds as a function of a state of the thawing or of the tempering of the food products.

* * * * *